United States Patent
Weaver et al.

(10) Patent No.: US 7,896,580 B2
(45) Date of Patent: Mar. 1, 2011

(54) SELF DRILLING ROCK BOLT

(75) Inventors: Steven Weaver, New South Wales (AT);
Darren Webb, New South Wales (AT);
John Horsch, New South Wales (AT);
Matthew Kenny, New South Wales (AT)

(73) Assignee: Sandvik Intellectual Property AB, Sandviken (SE)

( * ) Notice: Subject to any disclaimer, the term of this patent is extended or adjusted under 35 U.S.C. 154(b) by 0 days.

(21) Appl. No.: 12/084,684

(22) PCT Filed: Nov. 8, 2006

(86) PCT No.: PCT/AU2006/001669
§ 371 (c)(1),
(2), (4) Date: Apr. 20, 2009

(87) PCT Pub. No.: WO2007/053893
PCT Pub. Date: May 18, 2007

(65) Prior Publication Data
US 2009/0220309 A1   Sep. 3, 2009

(30) Foreign Application Priority Data

Nov. 9, 2005   (AU)  ............................... 2005906216
Mar. 1, 2006   (AU)  ............................... 2006901028
Jun. 29, 2006  (AU)  ............................... 2006202778

(51) Int. Cl.
*E21D 21/00* (2006.01)
(52) U.S. Cl. ............... 405/259.4; 405/259.5; 405/259.1
(58) Field of Classification Search .............. 405/259.1, 405/259.2, 259.3, 259.4, 259.5, 259.6, 302.1, 405/288
See application file for complete search history.

(56) References Cited

U.S. PATENT DOCUMENTS

| | | | |
|---|---|---|---|
| 1,379,209 A | | 5/1921 | Phillips |
| 2,171,985 A | | 9/1939 | Mushet |
| 2,667,037 A | * | 1/1954 | Thomas et al. ........... 405/259.3 |
| 4,026,186 A | | 5/1977 | Williams, Jr. et al. |
| 4,299,515 A | * | 11/1981 | Yates et al. .............. 405/259.1 |
| 4,413,930 A | * | 11/1983 | Calandra, Jr. ............ 405/259.6 |

(Continued)

FOREIGN PATENT DOCUMENTS

WO   WO 2007/059580   5/2007

(Continued)

*Primary Examiner*—Frederick L Lagman
(74) *Attorney, Agent, or Firm*—Drinker Biddle & Reath LLP

(57) ABSTRACT

A self drilling rock bolt incorporating a shaft and an anchoring device. A first end of the bolt has a drill tip to penetrate rock and a second end is adapted to be connected to a drilling apparatus to allow rotation of, and thrust to, the bolt. A circulation passage is provided to allow fluid to be passed to the drill tip and in one form a central passage is formed in the shaft to form part of this circulation passage. The anchoring device is operative to retain the bolt when located in a drilled hole and comprises a mandrel having one or more inclined external surface mounted to, or integrally formed with, the shaft and at least one expansion element overlaying the mandrel. The expansion element(s) is displaced radially outwardly on a predetermined relative movement between the mandrel and the element.

39 Claims, 7 Drawing Sheets

U.S. PATENT DOCUMENTS

| | | | | |
|---|---|---|---|---|
| 4,865,489 A | * | 9/1989 | Stankus et al. | 405/259.3 |
| 4,946,314 A | * | 8/1990 | Gruber | 405/259.5 |
| 4,990,042 A | | 2/1991 | Szayer et al. | |
| 5,183,357 A | | 2/1993 | Palm | |
| 5,184,923 A | * | 2/1993 | Calandra et al. | 405/259.4 |
| 5,275,512 A | * | 1/1994 | Wright | 405/259.6 |
| 5,297,909 A | | 3/1994 | Tsay et al. | |
| 5,433,558 A | * | 7/1995 | Gray | 405/259.1 |
| 5,664,900 A | | 9/1997 | Matthies | |
| 7,296,950 B1 | * | 11/2007 | Stankus et al. | 405/259.6 |
| 2006/0078391 A1 | * | 4/2006 | Stankus et al. | 405/259.4 |
| 2008/0260472 A1 | * | 10/2008 | Craig | 405/259.4 |

FOREIGN PATENT DOCUMENTS

WO     WO 2008/000015     1/2008

* cited by examiner

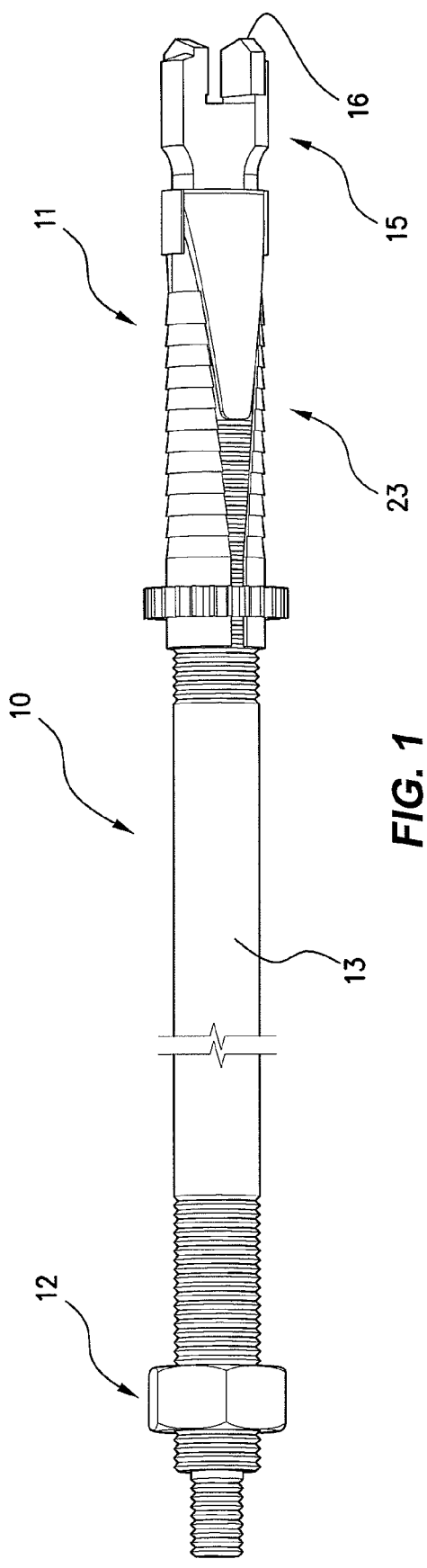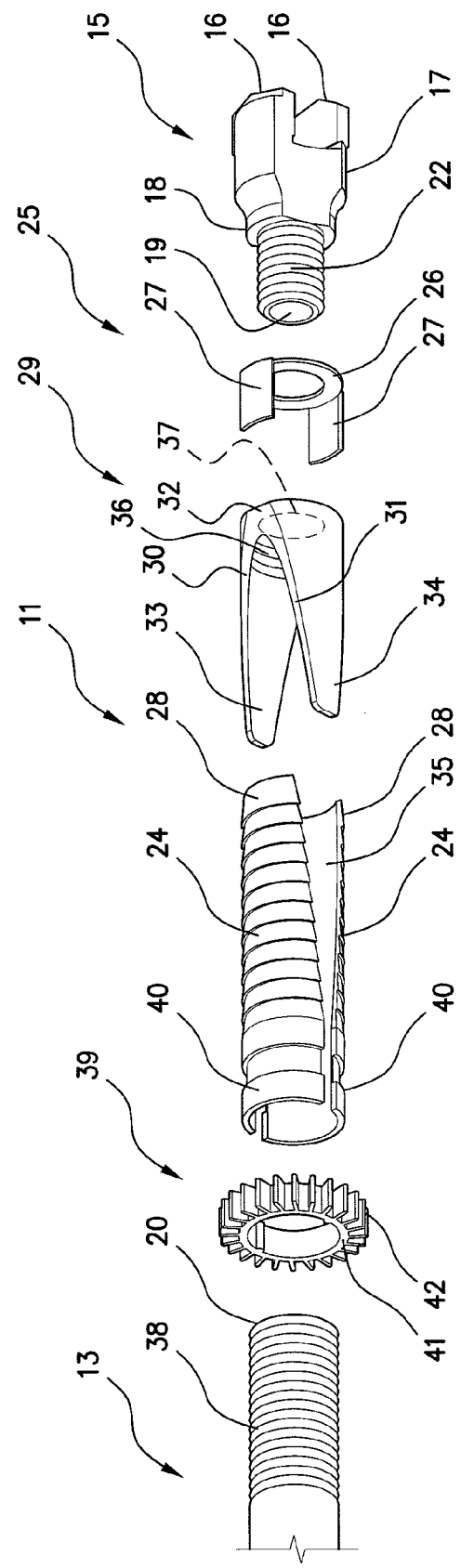

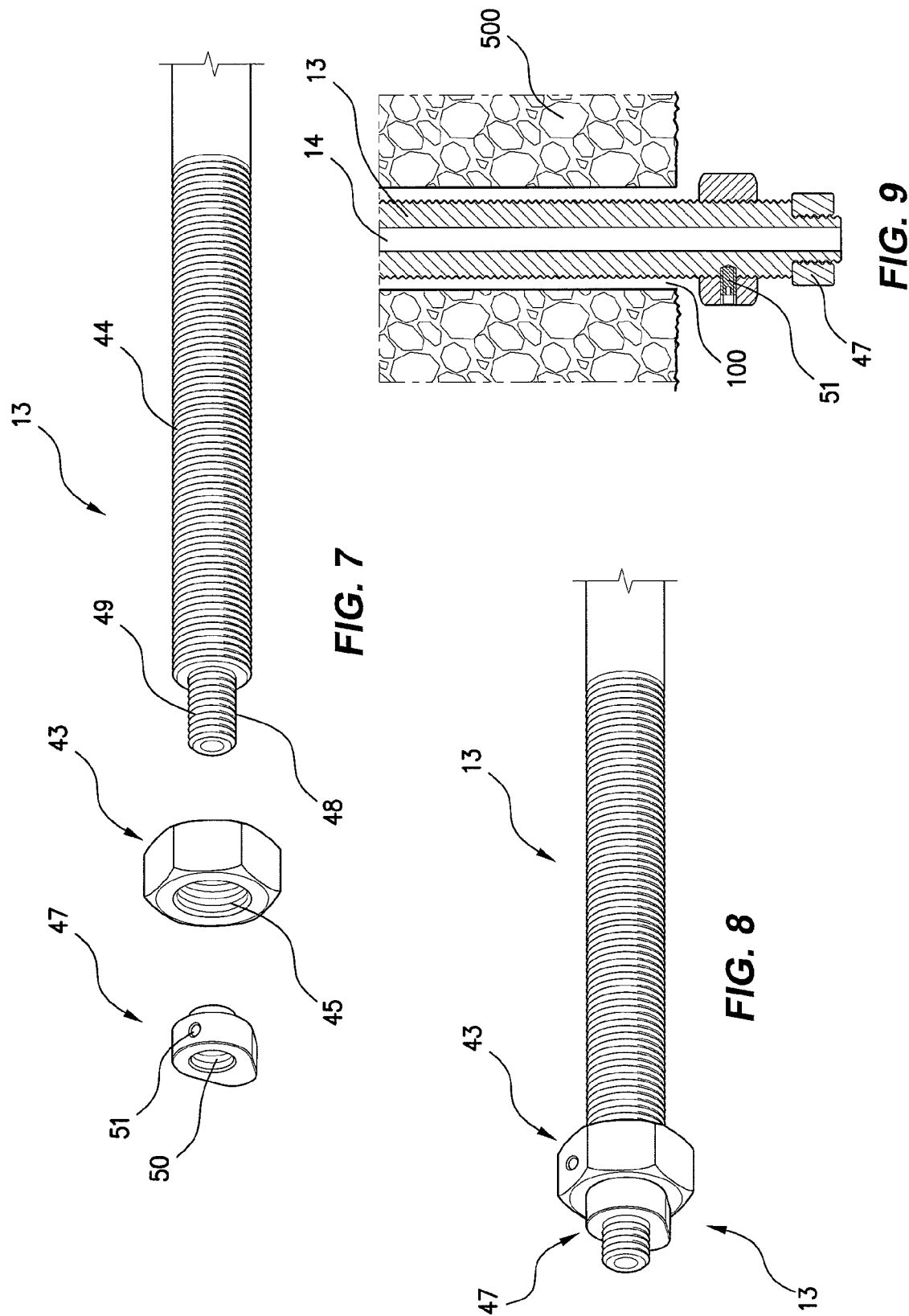

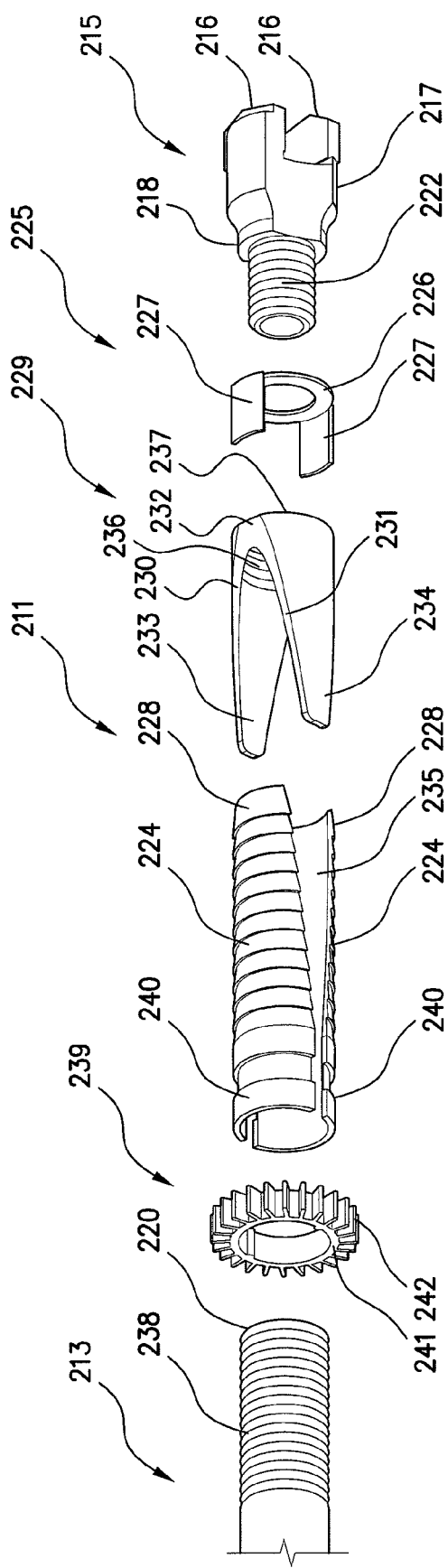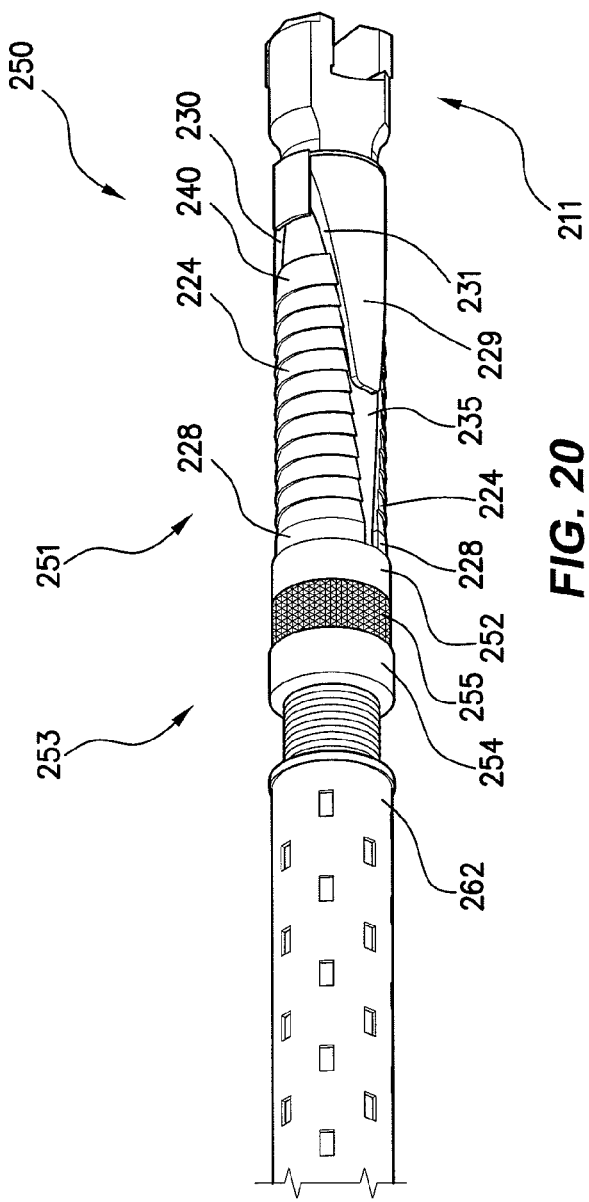
FIG. 12
FIG. 20

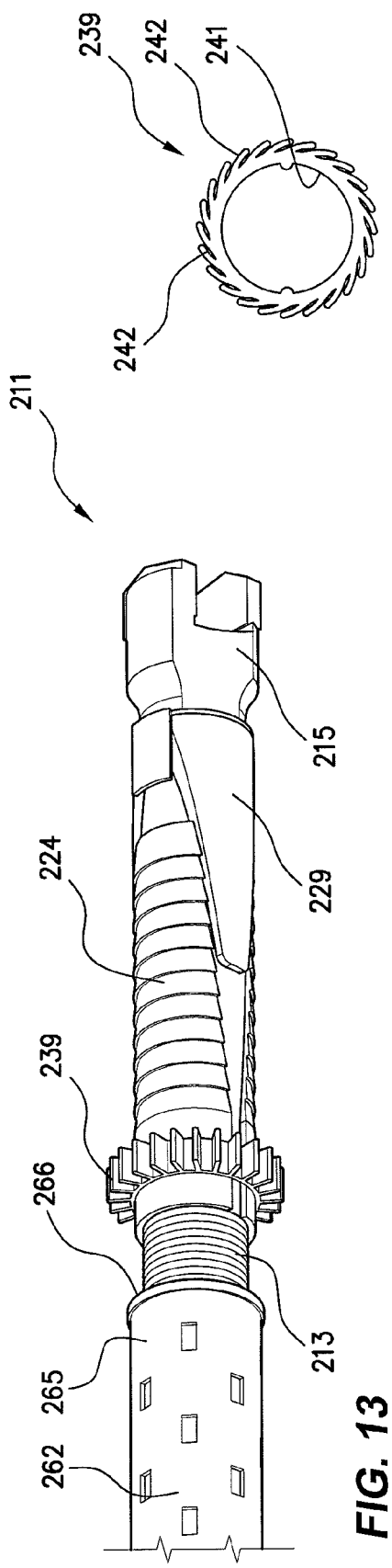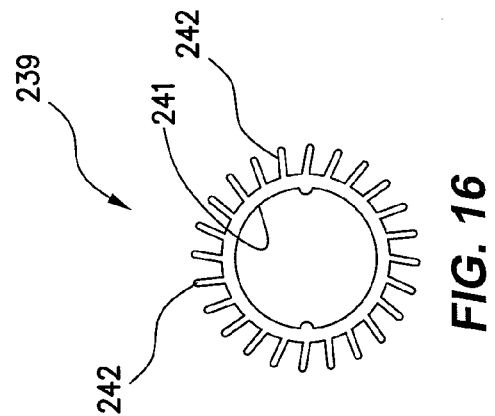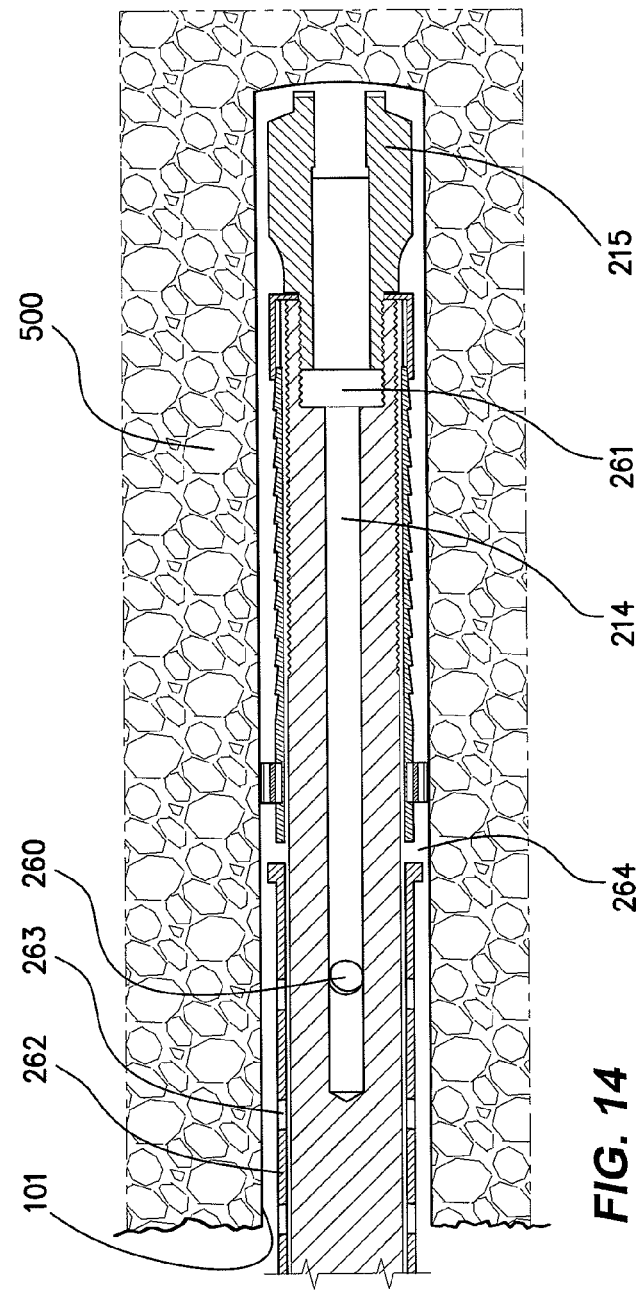
FIG. 13
FIG. 15
FIG. 16
FIG. 14

SELF DRILLING ROCK BOLT

TECHNICAL FIELD

The present invention relates to rock bolts suitable for use in the mining and tunneling industry to provide roof and wall support. The invention is suitable for use in hard rock applications as well as in softer strata, such as that often found in coal mines, and it is to be appreciated that the term "rock" as used in the specification is to be given a broad meaning to cover both these applications.

BACKGROUND

Roof and wall support is vital in mining and tunneling operations. Mine and tunnel walls and roofs consist of rock strata, which must be reinforced to prevent the possibility of collapse. Rock bolts are widely used for consolidating the rock strata.

In conventional strata support systems, a hole is drilled into the rock by a drill rod, which is then removed and a rock bolt is then installed in the drilled hole and secured in place typically using a resin or cement based grout.

To improve this process, self drilling rock bolts have been proposed whereby the bolt is also used as the drill rod. As such, with a self drilling rock bolt, the hole can be drilled and the bolt installed in a single pass.

Whilst self drilling rock bolts provide the opportunity to substantially improve installation times of rock bolts, they have not been widely used typically because of their cost of manufacture.

SUMMARY OF THE INVENTION

In accordance with the present invention, a self drilling rock bolt is provided that comprises first and second ends, a shaft extending between the ends, and an anchoring device, the first end having a drill tip to penetrate rock and the second end being adapted to be connected to a drilling apparatus to allow rotation of, and thrust to, the bolt, the anchoring device being operative to retain the bolt when located in a drilled hole and comprising a mandrel having one or more external surfaces that are inclined to the shaft, the mandrel being mounted to or integrally formed with the shaft and at least one expansion element overlaying the wedge portion, wherein the at least one expansion element is displaced radially outwardly on a predetermined relative movement between the wedge portion and the at least one expansion element.

In a particular form, the bolt is rotatable about an axis of the bolt in a first direction in a drilling operation and is rotated in an opposite second direction to cause the predetermined movement between the mandrel and the at least one expansion element so as to enable the anchoring device to become operative to retain the bolt in a drilled hole.

In one form, the mandrel is mounted to the shaft. Further, the at least one expansion element and the mandrel may be connected to the bolt shaft in a manner that allows them to be rotatable relative to the shaft about the bolt axis. Furthermore, in at least one form, the inner surface of the at least one expansion element and the external inclined surface(s) are shaped so that relative rotation between the at least one expansion element and the mandrel is prevented. As such, the at least one expansion element and the mandrel rotate together about the bolt shaft.

In a particular form of the above mentioned arrangement, on rotating the shaft in a second direction relative to the anchoring device, the at least one expansion element is restrained from axial movement along the bolt shaft, whereas the mandrel is movable axially along the shaft in a direction that causes outward displacement of the at least one expansion element. Accordingly, with this configuration, rotation of the shaft relative to the anchoring device induces relative movement between the at least one expansion element and the mandrel to cause the radial outward displacement of the at least one expansion element.

In a particular form, the mandrel is connected to the shaft via a threaded coupling comprising an external thread on the shaft and a complementary inner thread disposed on an inner surface of the mandrel. In this way, the threaded coupling induces axial movement of the mandrel on the shaft under relative rotation between the shaft and the mandrel. In a particular form, movement of the mandrel down the shaft (i.e. towards the second end) causes the at least one expansion element to be displaced radially outwardly.

In one embodiment, the anchoring device further comprises a band disposed about the at least one expansion element. In a particular form, the band has two primary functions; a first function is to retain the expansion element in a retracted condition, a second function is to promote relative rotation between the anchoring device and the bolt shaft when the bolt is rotated in the second direction so as to instigate the radial outward displacement of the expansion element.

In a particular form, the band includes a profiled surface that is arranged to pass over the rock surface of a drilled hole on rotation of the bolt in the first (drilling) direction and is arranged to have a higher tendency to grip the wall surface of a drilled hole on rotation of the band in the opposite second direction. In a particular form, the band incorporates a band body and a plurality of flaps which form the profiled surface of the band and which extend from the band body. In this arrangement, on engagement of the surface of the band with the wall surface of a drilled hole, the flaps are biased to fold against the band body when rotated in the first direction and are biased to extend outwardly so as to grip the wall surface of the drilled hole when the bolt is rotated in the second direction.

In a particular form, the band is formed from a polymeric material.

In one form, the self drilling rock bolt incorporates an inner passage within the shaft. The shaft is typically made from steel and this passage provides part of a circulation passage to allow drilling fluid to be introduced, or withdrawn, at the first end of the bolt and to enable grout to be pumped into the drilled hole to set the rock bolt in place. Typically the circulation passage further includes a second passage that is formed between the bolt shaft and the wall surface of the drilled hole.

The hollow shaft may be formed by various techniques. In a particular embodiment, the shaft is formed from an elongate metal section that is folded over so that opposite longitudinal edges of the metal section are brought into contact to form the seam. One such hollow rod of this form is manufactured and supplied by OneSteel Pty Ltd and uses a steel section. Such construction of hollow rod has the advantage that it can be made relatively inexpensively and therefore is ideally suited for applications such as in self-drilling rock bolts where the bolt is for single use.

In another form, the shaft may be solid along at least a portion of its length and a sleeve is arranged to extend about that portion to provide a passage between the shaft and sleeve. This passage in turn forms part of the circulation passage. Such an arrangement is disclosed in the Applicant's corresponding international application entitled "Self Drilling Rock Bolt" filed on the same date as this application, the contents of which are herein incorporated by cross-reference.

In one form, the drill tip extends radially from the bolt axis, a distance greater than the shaft to provide the passage between the shaft and the wall of the drilled hole. In one form, the drill tip is located directly on the shaft of the bolt, which may be modified to accept the drill tip such as through a milling or forging operation.

In an alternative form, the rock bolt further comprises a drill bit which is connected to an end of the shaft and which incorporates the drill tip thereon. In this arrangement, the drill bit is connected to the end of the shaft by a coupling that is arranged to impart rotation to the drill bit from the shaft when the shaft is rotated in at least one direction. In this regard, the coupling may be permanent i.e. the drill bit may be welded on to the shaft, or alternatively the drill bit may be removable. In this latter arrangement, the coupling may be in the form of interfitting projections and recesses that allow rotation to be imparted or alternatively a threaded coupling may be used wherein the drill bit incorporates a shank having an external thread and a complementary inner thread is disposed on an inner surface of the shaft.

In one form, the anchoring device is disposed adjacent the first end. In the arrangement described above, where the at least one expansion element is restrained from axial movement along the shaft, this expansion element may be restrained at one end of the at least one expansion element thereby allowing the remainder of the expansion element to extend radially outwardly. In one form, the at least one expansion element may be seated in a groove disposed about the shaft or may be captured by a retaining collar disposed about the shaft. In an alternative form, the expansion element may be designed to be captured between the drill bit and the shaft end so as to restrain the expansion element from axial movement.

In one form, the expansion element projects downwardly from the restrained end towards the second end of the rock bolt. In another form, the expansion element projects upwardly towards the first end of the rock bolt. In this latter arrangement, the at least one expansion element may be located in a groove, or bear against a retaining collar disposed on the shaft at a location spaced from the first end.

In a particular form, a plurality of expansion elements are provided which in use are angularly spaced about the shaft axis. In a particular form, a connector is provided which interconnects the expansion elements and which is arranged to engage with the bolt shaft so as to prevent the axial movement of the expansion elements along the shaft. In one form, this connector may be formed in multiple pieces, or is able to be deformed, so as to extend about and locate in a recess in the shaft.

In an alternative arrangement to the above, the expansion elements are formed as a single piece which incorporates a central aperture. In this arrangement, in one form the expansion elements are designed to locate between the drill bit and the shaft end with a shank of the drill bit being arranged to extend within the aperture formed in the connector. In another form, the shaft extends through the aperture and the expansion elements are held in place by one or more retaining collars.

In a particular form, the rock bolt further comprises a drive coupler disposed adjacent to the second end and which is designed to interengage with the drilling apparatus. The drive coupler is also connected to the shaft so as to allow rotation of and thrust to be imparted to the bolt shaft.

In a particular form, the drive coupler is in the form of a drive nut which is connected to the bolt shaft through a threaded coupling comprising an external thread disposed on the shaft and a complementary inner thread disposed on an inner surface of the drive nut.

In a particular form, a stop is provided which is operative to inhibit axial movement of the drive nut beyond a predetermined location on the shaft. In a particular form, this stop is in the form of a lock nut which is secured to the shaft and which is coupled to the shaft through a threaded coupling which preferably has a handed thread which is opposite to that used on the drive nut.

In one form, a torque device is arranged to restrict axial movement of the drive nut along the shaft until a predetermined torque is supplied to the nut. In a particular form, this torque device is in the form of a torque pin which extends radially through the nut and into the shaft, and wherein the torque pin is operative to shear on the application of a predetermined torque to the nut. In one form, the torque device may also act as the stop to inhibit the axial movement of the drive nut beyond a predetermined location on the shaft.

In operation of a particular embodiment of the self drilling rock bolt, the bolt is secured to a drilling apparatus, via the drive nut, which rotates the rock bolt in the first direction. Drilling fluid is pumped to the first end to flush the cutting surface of the rock bolt. On completion of the drilling phase, the drilling apparatus then rotates the bolt in the opposite direction which causes activation of the anchoring device and in a particular form causes the mandrel to move axially down the bolt shaft causing the expansion element(s) to expand.

In a particular form, the threaded coupling for both the mandrel and the drive nut has the same handed thread. With this arrangement, on rotation in the second direction, the drive nut rotates with the shaft as relative movement is prevented by the torque pin, thereby causing the shaft to rotate in the second direction. If the band is disposed around the expansion element this rotation causes the band flaps to flare outwards causing the band, and in turn, the expansion element(s) and mandrel to start to slip relative to the bolt shaft. If no band is provided, the expansion element(s) are caused to directly grip the bore wall to induce the expansion element(s) to slip. This relative movement induced between the anchoring device and the shaft causes the mandrel to wind down the thread of the shaft thereby causing the expansion elements to displace radially outwardly to move into tighter engagement with the rock surface of the drilled hole.

When the expansion elements are firmly engaged with the wall surface, the bolt becomes firmly held in place. Accordingly if need be the drilling apparatus can be detached and at some later time grout can be injected into the hole to set the bolt in place.

The bolt can also be placed in tension at that time by continuing to apply torque in the second direction to the drive nut. At a particular point, the expansion elements are forced so hard against the rock wall surface that the wedge cannot move down the shaft any further. This then effectively binds the bolt and inhibits it from rotating any further. This builds up the torque at the drive nut until it reaches a point where it will shear the torque pin thereby allowing the drive nut to move relative to the shaft. This relative movement then causes the nut to wind up the shaft.

Once the drive nut is able to move along the bolt shaft, it will then move into engagement with the outer face of the rock strata (either directly or through a bearer plate) which will then enable the bolt to be placed in tension as the distance of the bolt between the drive nut and the anchoring device is shortened. This places the rock strata in compression. Once the bolt is under sufficient tension, the drilling apparatus can then be removed and the final stage of setting the bolt in place by the introduction of the grout through the inner passage of the bolt can then be performed.

BRIEF DESCRIPTION OF THE DRAWINGS

It is convenient to hereinafter describe embodiments of the present invention with reference to the accompanying drawings. The particularity of the drawings and the related description is to be understood as not superseding in generality of the preceding broad description of the invention.

In the drawings:

FIG. 1 is a schematic perspective view of a self drilling rock bolt;

FIG. 2 is an exploded view of a first end of the rock bolt of FIG. 1;

FIG. 7 is an exploded view of a second end of the rock bolt of FIG. 1;

FIG. 8 is a perspective view of the second end of rock bolt of FIG. 1;

FIG. 9 is a sectional view of the second end of FIG. 8 when located in rock strata;

FIG. 12 is an exploded view of a first end of the rock bolt of FIG. 11;

FIG. 13 is a perspective view of the first end of the rock bolt of FIG. 11;

FIG. 14 is a sectional view of the first end of the rock bolt of FIG. 11 when located in rock strata;

FIG. 15 is a detailed view of an anchor band of the rock bolt of FIG. 11 in a collapsed condition;

FIG. 16 is the anchor band of FIG. 15 in an expanded condition;

FIG. 20 is a variation of the rock bolt of FIG. 11.

DETAILED DESCRIPTION OF THE DRAWINGS

Figure 5:
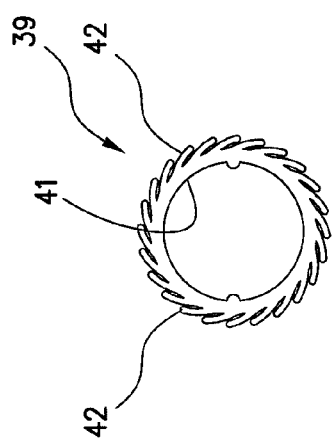
FIG. 5 is a detailed view of an anchor band of the rock bolt of FIG. 1 in a collapsed condition.

FIG. 1 illustrates a self drilling rock bolt 10 which incorporates a first (drilling) end 11 and a second (nut) end 12 and a shaft 13 which extends between the opposite ends 11, 12. The shaft 13, which is typically made from steel, is hollow and incorporates a central passage 14 (see FIGS. 4 and 9) which allow fluid to be passed from the nut end 12 to the drilling end 11. At least a central portion of the shaft 13 may be perforated through numerous holes that extend radially outwardly from the central passage 14. In use, the self drilling rock bolt 10 is connected to a drilling apparatus (not shown) and acts as a drill rod to drill a hole 100 (see FIGS. 4 and 9) into rock strata 500. Thereafter, the rock bolt 10 is secured in place as will be explained in more detail below to provide support for the rock strata 500.

The drilling end 11 incorporates a drill bit 15 incorporating a drill tip 16 at a distal end thereof and an anchoring device 23 which in use is arranged to retain the bolt in a drilled hole. The anchoring device 23 may be used to retain the bolt 10 in the drilled hole so as to temporarily secure the rock bolt in place prior to the introduction of grout into the hole 100 to permanently fix the bolt in place and/or to tension the bolt so as to place the rock strata 500 in compression.

The details of the drilling end 11 are best seen in FIGS. 2 to 6.

Figure 4:
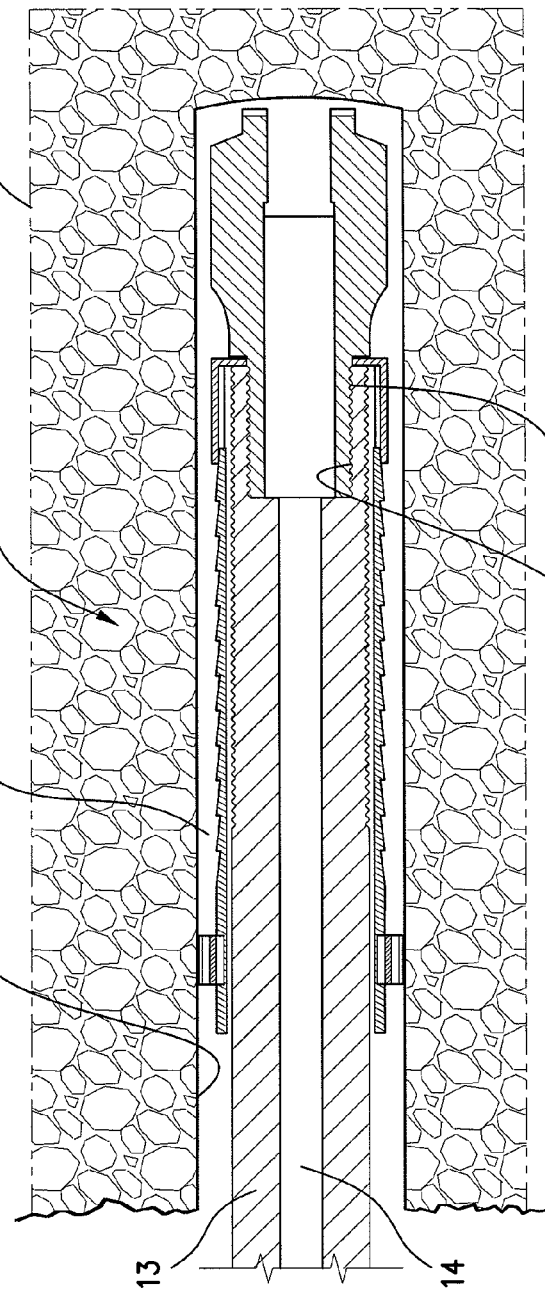
FIG. 4 is a sectional view of the first end of the rock bolt of FIG. 1 when located in rock strata.

As best seen in FIG. 2, the drill bit 15 includes a bit body 17 which includes the drill tip 16 at its outer end and a drill bit shank 18 which incorporates an external thread 22 on its outer surface. A passage 19 extends from the distal tip of the shank 18 through to the distal end of the bit body 17. This passage 19 is arranged to be in fluid communication with the passage 14 of the shaft when the drill bit 15 is secured to the shaft end 20 (as best seen in FIG. 4). The shaft end 20 includes an inner thread 21 (see FIG. 4) which is complementary to the external thread 22 on the drill bit shank 18. As such, the drill bit 15 can be simply screwed on to shaft end 20 of the shaft 13.

During a drilling operation, the drilling apparatus typically induces right hand rotation to the drill shaft. To ensure that the drill bit 15 does not separate from the shaft during the drilling operation, the threaded coupling between the drill bit 15 and the shaft 13 is a right handed thread so as to tend to cause the threaded coupling between the drill bit and shaft to tighten during a drilling operation.

The anchoring device 23 is disposed below the drill bit 15 and includes a pair of expansion elements 24 which are designed to be caused to move outwardly from a retracted position as illustrated in the drawings to an expanded condition (not shown) wherein the expansion elements 24 engage the wall 101 of the drilled hole 100.

The expansion elements 24 are interconnected by a connector 25. This connector is typically made from spring steel and includes a body section 26 and connecting legs 27. The connecting legs 27 are welded (or otherwise fixed) to a proximal end 28 of the expansion elements 24. By making the connector 25 from spring steel, it can flex thereby providing a live hinge that allows pivoting of the expansion elements so as to enable it to easily move between its retracted and its extended position.

In use, the body 26 of the connector is arranged to be captured between the drill bit 15 and shaft end 20 in a manner that allows the expansion elements to rotate about the shaft axis 20 but prevents them from moving axially along the bolt shaft.

The anchoring device 23 further includes a mandrel 29 which in the illustrated form includes opposite inclined surfaces 30 and 31. The mandrel 29 includes a head portion 32 and two depending legs 33 and 34 with opposite faces of the head portion 32 and opposite edge surfaces of the legs 33 and 34 forming respective ones of the inclined surfaces 30 and 31.

The mandrel is arranged so that the inclined surfaces 30 and 31 are designed to abut with inner surfaces 35 of the expansion elements 24 in a manner such that relative movement of the mandrel towards the nut end 12 of the shaft causes the expansion elements to move from their retracted position to their extended position.

To enable this relative movement, the mandrel is coupled to the bolt shaft which in the illustrated arrangement is through a threaded coupling with an internal thread 36 formed in an inner bore 37 in the head portion 32 of the mandrel 29 and an external thread 38 formed on the bolt shaft 13.

The threaded coupling between the mandrel 29 and the bolt shaft 13 is a left handed thread so that when the rock bolt is undergoing a drilling operation (under right hand rotation of the shaft), any relative motion between the mandrel and the shaft would cause the mandrel to move towards the drill end thereby ensuring that the expansion elements are not moved to their expanded condition.

The anchoring device 23 further comprises an anchor band 39 which is disposed around a distal end 40 of the expansion elements 24. The anchor band 39 is typically made from a polymeric material and includes a band body 41 and a plurality of flaps 42 which are disposed around the periphery of the band body 41 to form a profiled surface 43.

Figure 6:
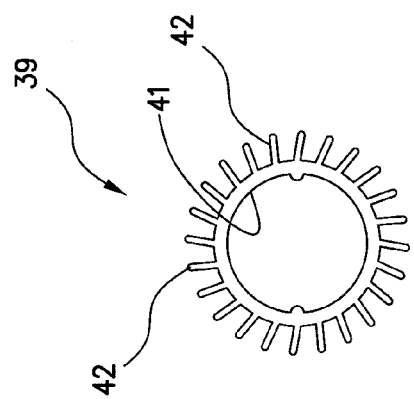
FIG. 6 is the anchor band of FIG. 5 in an expanded condition.
Figure 3:
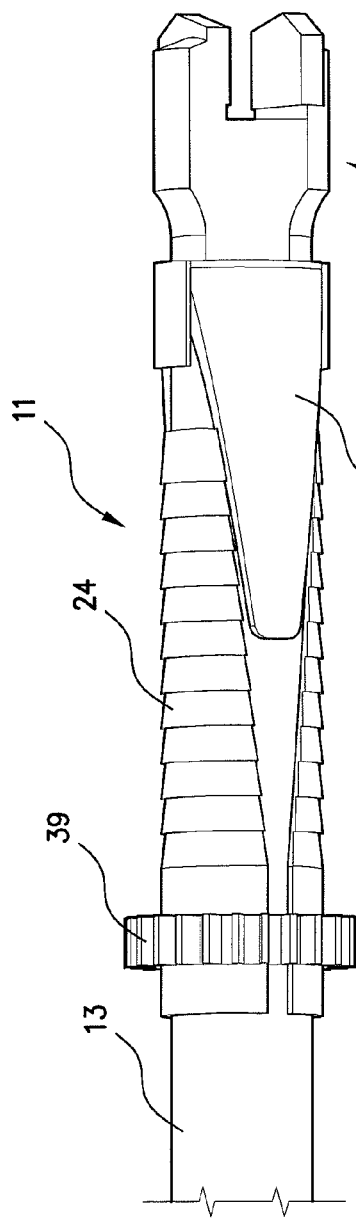
FIG. 3 is a perspective view of the first end of the rock bolt of FIG. 1.

This profiled surface 43 of the band 39 is arranged to adopt two conditions as best illustrated in FIGS. 5 and 6. In the first condition as illustrated in FIG. 5, the flaps 42 are folded against the band body 41. This condition occurs when the band undergoes right hand rotation as would be the case during the drilling operation. In the second condition as best illustrated in FIG. 6, the flaps 42 project outwardly from the band body 39. This occurs during the opposite rotation of the bolt shaft and is induced by the band passing over the wall 15, surface 101 of the drilled hole under this rotation. When in this second (or expanded) condition, there is a much greater tendency for the band to engage the wall surface 101 of the drilled hole. Once it does grip, the anchoring device begins to slip relative to the shaft thereby inducing some relative movement. This movement, in turn causes the mandrel to start winding down the shaft thereby causing the expansion elements to be displaced outwardly.

Figure 10:
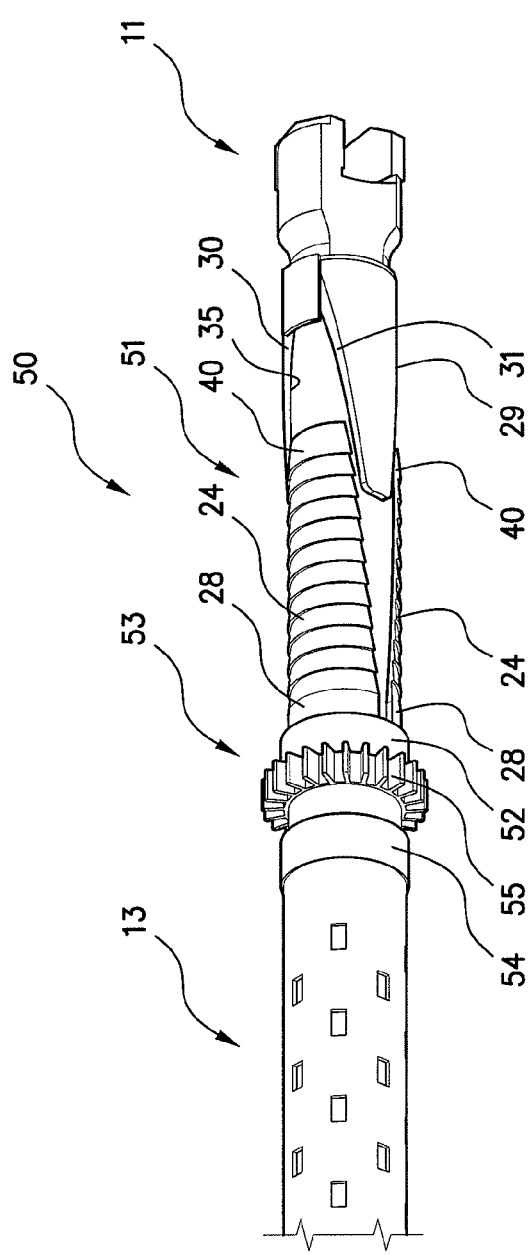
FIG. 10 is a variation of the rock bolt of FIG. 1.

A rock bolt 50 is disclosed in FIG. 10 which incorporates a variation of the anchoring device 23 of the bolt 10. As the bolt 50 includes many of the features of the bolt 10, like features have been given like reference numerals.

In the bolt 50, an expansion assembly 51 is provided that includes the expansion elements 24 and a collar 52 disposed about the shaft 13 of the bolt 50. The collar 52 functions in the same way as the connector 25 of the earlier embodiment and interconnects the proximal ends 28 of the expansion elements 24.

In contrast to the earlier embodiment, the expansion assembly 51 is orientated so that the distal ends 40 of the expansion elements face towards the drill end 11, rather than the nut end 12 as in the earlier embodiment. To prevent movement of the expansion assembly 51 towards the nut end 12, the assembly 51 is seated on a retaining device 53 that comprises a thrust ring 54 that is axially fixed to the bolt shaft 13 and a slip ring 55 disposed between the thrust ring 54 and the collar 52.

In an arrangement consistent with the earlier embodiment, the assembly 51 incorporates the mandrel 29 arranged so that its inclined surfaces 30 and 31 are designed to abut with inner surfaces 35 of the expansion elements 24. In this way relative rotation between the mandrel 29 and the expansion elements 24 about the shaft axis is inhibited. Further, relative movement of the mandrel 29 towards the nut end 12 of the shaft causes the expansion elements to move from their retracted position to their extended position. Furthermore, the mandrel is coupled to the bolt shaft by a threaded coupling (not shown). The threaded coupling between the mandrel 29 and the bolt shaft 13 is a left handed thread so that when the rock bolt is undergoing a drilling operation (under right hand rotation of the shaft), any relative motion between the mandrel and the shaft would cause the mandrel to move towards the drill end thereby ensuring that the expansion elements are not moved to their expanded condition. Under left hand rotation of the bolt 50 rotation of the expansion element is arranged to occur and whilst not shown, the anchor device 23 may also incorporate the band 39 to promote this rotation. Because the mandrel portion 29 and the expansion assembly 51 rotate together, this rotation is translated to the mandrel 29, to activate the device 23 and cause movement of the mandrel towards the nut end 12.

FIGS. 7 to 9 illustrate the nut end 12 of the rock bolt 10. A drive coupler 43 is disposed adjacent to the end 12 and arranged to inter-engage with the drilling apparatus and the shaft so as to allow rotation and thrust to be imparted to the bolt shaft. The drive coupler 43 is in the form of a drive nut which is connected to the bolt shaft 13 through a threaded coupling comprising external thread 44 disposed on the shaft 13 and a complementary inner thread 45 disposed on an inner surface of the drive nut.

The threaded coupling in the illustrated form is a left handed thread so that during a drilling operation, the torque applied to the drive nut tends to cause it to wind off the second end of the shaft 13. To prevent this, a stop assembly 46 is provided which is operative to inhibit axial movement of the drive nut beyond a predetermined location on the shaft. In the illustrated form, this stop is in the form of a lock nut 47 which is secured to a terminal end portion 48 of the shaft which is of a reduced diameter. The lock nut 47 is coupled to the terminal end portion 48 by a threaded coupling (i.e. an external thread 49 on the terminal end and a complementary inner thread 50 on the nut) that is oppositely handed to the drive nut threaded coupling.

Furthermore, the drive nut 47 is also coupled to the shaft by a torque pin 51 which is arranged to restrict relative movement of the drive nut until a predetermined torque is supplied to the nut. The torque pin 51 extends radially through the nut 47 and into the shaft 13 (as best illustrated in FIG. 9), and is operative to shear on the application of a predetermined torque to the nut. If the torque pin 51 is designed to be of sufficient strength, it can obviate the need to incorporate the lock nut 47.

Whilst the self drilling rock bolt 10 is shown in the illustrated form with a shaft having a central passage, it is to be appreciated that the invention is not limited to that arrangement. For example the rock bolt may include a shaft which is solid along at least a substantial part of its length. Such an arrangement is shown in FIGS. 11 to 20.

Figure 11:
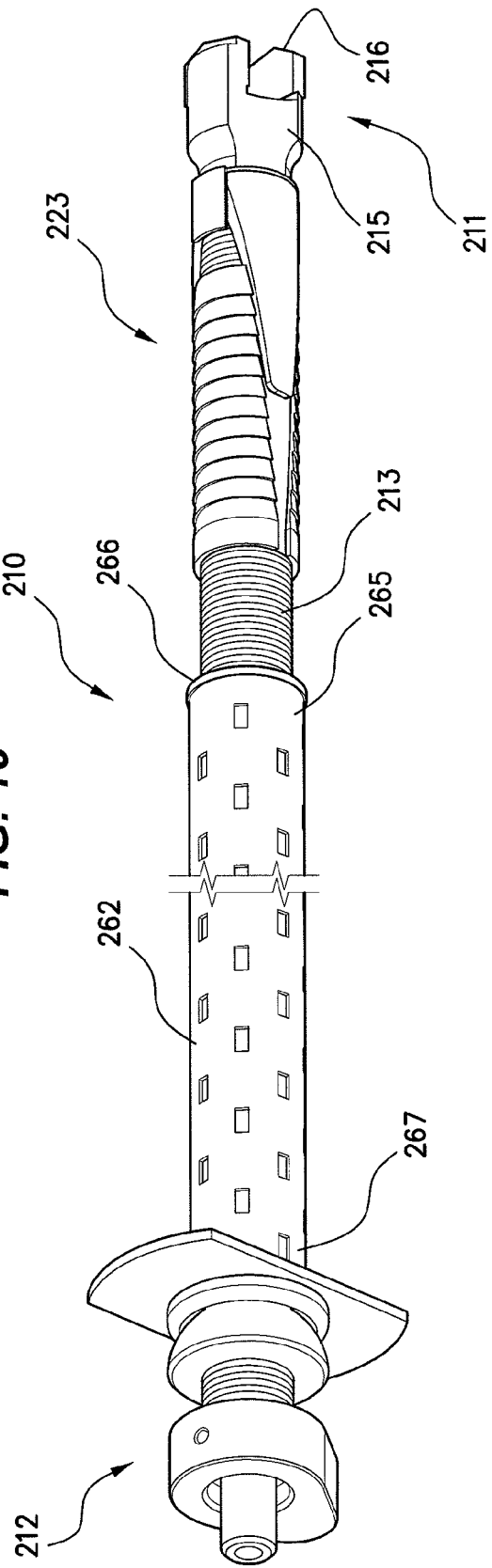
FIG. 11 is a schematic perspective view of a second embodiment of self drilling rock bolt.

FIG. 11 illustrates a self drilling rock bolt 210 according to a further embodiment which incorporates a first (drilling) end 211 and a second (nut) end 212 and a shaft 213 which extends between the opposite ends 211, 212. The shaft 213, which is typically made from steel, is solid along a major (second) part of its length and incorporates an inner passage 214 (see FIG. 14) along a distal (first) part of bolt adjacent the drilling end. The inner passage communicates with the exterior of the shaft at two places; though a lateral port 260, and through an end port 261.

The drilling end 211 incorporates a drill bit 215 incorporating a drill tip 216 at a distal end thereof and an anchoring device 223 which in use is arranged to retain the bolt in a drilled hole. The anchoring device 223 extends along the first part of the bolt and is used to retain, the bolt 210 in the drilled hole so as to temporarily secure the rock bolt in place prior to the introduction of grout into the bored hole 100 to permanently fix the bolt in place and/or to tension the bolt so as to place the rock strata 500 in compression.

The details of the drilling end 211 are best seen in FIGS. 12 to 16.

As best seen in FIG. 12, the drill bit 215 includes a bit body 217 which includes the drill tip 216 at its outer end and a drill bit shank 218 which incorporates an external thread 222 on its outer surface. A passage 219 extends from the distal tip of the shank 218 through to the distal end of the bit body 217. This passage 219 is arranged to be in fluid communication with end port 261 of the inner passage 214 of the shaft when the drill bit 215 is secured to the shaft end 220 (as best seen in FIG. 14). The shaft end 220 includes an inner thread 221 (see FIG. 14) which is complementary to the external thread 222 on the drill bit shank 218. As such, the drill bit 215 can be simply screwed on to shaft end 220 of the shaft 213.

During a drilling operation, the drilling apparatus typically induces right hand rotation to the drill shaft. To ensure that the drill bit 215 does not separate from the shaft during the drilling operation, the threaded coupling between the drill bit 215 and the shaft 213 is a right handed thread so as to tend to cause the threaded coupling between the drill bit and shaft to tighten during a drilling operation.

The anchoring device 223 and its operation is of a form which is consistent with the earlier embodiment with like features given like reference numerals but prefixed by the number "2" to distinguish between embodiments. Similarly a variation of the anchoring device 223 of the bolt 210 is shown in FIG. 20 and is of a form that is the same as that disclosed in FIG. 10 and like features given like reference numerals but prefixed by the number "2" to distinguish between embodiments.

As best illustrated in FIGS. 11 and 14, the rock bolt 210 includes a sleeve 262 along a major part of the shaft 213. The sleeve 262 extends from adjacent the anchoring device 223 (or expansion assembly 251) through to and adjacent the nut end 212. The purpose of the sleeve is to provide at least part of a circulation path to allow fluid to be passed between the nut end 212 to the drilling end 211. This circulation path is provided by a passage formed between the bolt shaft 213 and the sleeve 262 as well as the inner passage 214. As best illustrated in FIG. 14, the inner passage 214 communicates with the passage 263 formed between the shaft 213 and the sleeve 262 through the lateral port 260. As the sleeve 262 does not need to take any significant load, it may be made from an inexpensive material such as plastic. A further advantage of making the sleeve from plastic is that it may provide a water barrier to inhibit corrosion of the steel shaft when in place.

The circulation path also includes an outer passage 264 formed between the sleeve 262 and the wall 101 of the drilled hole 100. This outer passage is formed by having the drill tip 216 extend radially a distance greater than the radius of the sleeve 262.

The sleeve 262 is sealed at its distal end 265 by a collar 266. This collar 266 in the illustrated form incorporates an internal thread and is threaded onto the external thread 238 machined on the upper part of the shaft 213.

The proximal end 267 of the sleeve 262 is also sealed by inter engaging with a drive coupler 243 as will be explained in further detail below.

Figure 19:
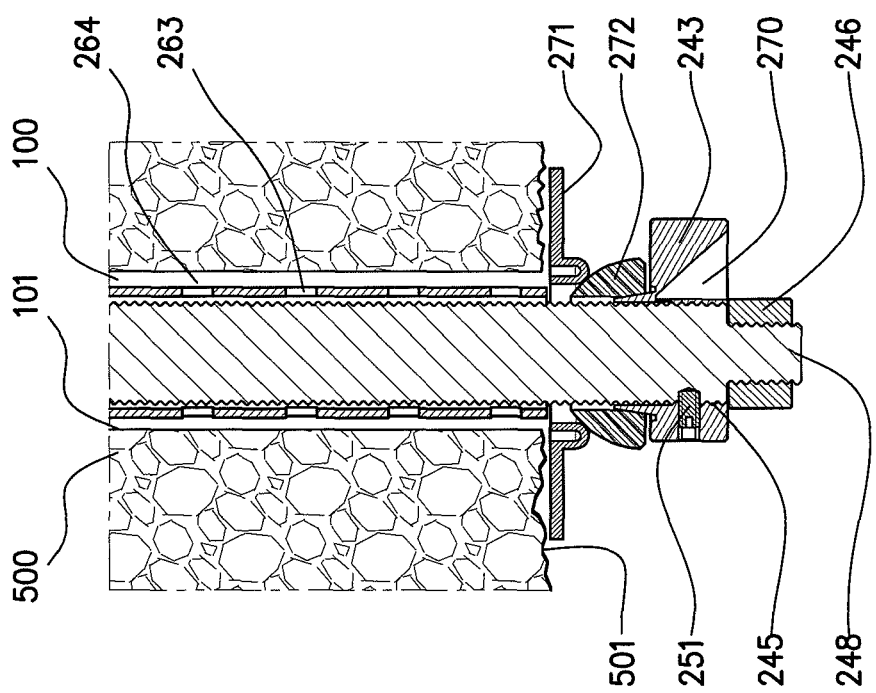
FIG. 19 is a sectional view of the second end of the rock bolt of FIG. 17 when located in rock strata.
Figure 18:
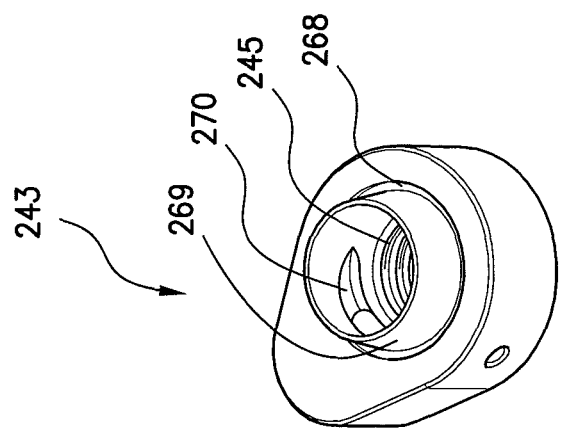
FIG. 18 is a perspective view of an irrigated drive nut located at the second end of rock bolt of FIG. 17.
Figure 17:
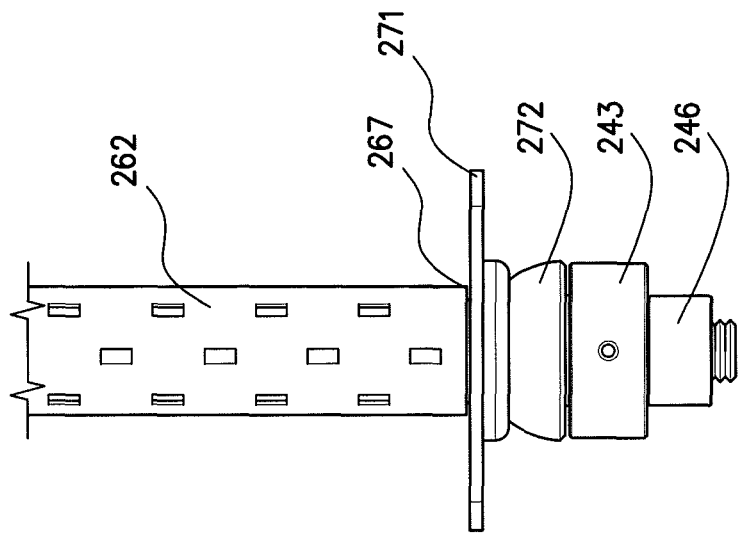
FIG. 17 is a perspective view of a second end of the rock bolt of FIG. 11.

FIGS. 17 to 19 illustrate the nut end 212 of the rock bolt 210 that incorporates the drive coupler 243. The drive coupler is disposed adjacent the end 212 and is arranged to inter-engage with the drilling apparatus and the shaft so as to allow rotation and thrust to be imparted to the bolt shaft 213. The drive coupler 243 is in the form of an irrigated drive nut 243 (as best seen in FIG. 18) which is connected to the bolt shaft 213 through a threaded coupling comprising an external thread 244 disposed on the shaft 213 and a complementary inner thread 245 disposed on an inner surface of the drive nut 243.

The threaded coupling in the illustrated form is a left handed thread so that during a drilling operation, the torque applied to the drive nut tends to cause it to wind off the second end of the shaft 213. To prevent this, a stop assembly 246 is provided which is operative to inhibit axial movement of the drive nut beyond a predetermined location on the shaft. In the illustrated form, this stop is in the form of a lock nut 247 which is secured to a terminal end portion 248 of the shaft which is of a reduced diameter. The lock nut 247 is coupled to the terminal end portion 248 by a threaded coupling (i.e. an external thread 249 on the terminal end and a complementary inner thread 250 on the nut) that is oppositely handed to the drive nut threaded coupling.

Furthermore, the drive nut 243 is also coupled to the shaft by a torque pin 251 which is arranged to restrict relative movement of the drive nut until a predetermined torque is supplied to the nut. The torque pin 251 extends radially through the nut 247 and into the shaft 213 (as best illustrated in FIG. 19), and is operative to shear on the application of a predetermined torque to the nut. If the torque pin 251 is designed to be of sufficient strength, it can obviate the need to incorporate the lock nut 247.

As best illustrated in FIG. 18, the drive nut 243 includes an annular recess 268 and a collar 269 which is arranged to receive the proximal end 267 of the sleeve so as to seal the drive nut 243 to that end. Furthermore, the drive nut 243 further incorporates a port 270 which allows fluid to be introduced or extracted from the passage 263 disposed between the sleeve 262 and the shaft 213.

A bearer plate 271 and ball washer 272 may be disposed on the shaft 213 and captured by the drive nut 243. The bearer plate 271 is arranged to bear against the outer face 501 of the rock strata 500.

In operation, the bolt 10 or 210 is secured to a drilling apparatus, via the drive nut 43, 243, which rotates the rock bolt in the first direction. Drilling fluid is pumped through the circulation passage of the bolt to flush the cutting surface of the rock bolt.

On completion of the drilling phase, the drilling apparatus then rotates the bolt in the opposite direction. The drive nut 43, 243 rotates with the shaft as relative movement is prevented by the torque pin. This opposite rotation is arranged to induce "slip" in the expansion elements 24, 224 and mandrel 29, 229 relative to the bolt shaft. This slip may be promoted by incorporation of the band 39, 239 with the rotation causing the band flaps 42, 242 to flare outwards causing the band to grip the wall surface 101. This relative movement induced between the anchoring device and the shaft causes the mandrel to wind down the thread of the shaft thereby causing the expansion elements to displace radially outwardly to engage the rock surface of the drilled hole.

When the expansion elements are engaged with the wall surface, the bolt becomes firmly held in place. Accordingly if need be, the drilling apparatus can be detached and at some later time grout can be injected into the hole to set the bolt in place.

The bolt can also be placed in tension at this stage by continuing to apply torque in the second direction to the drive nut 43, 243. At a particular point, the expansion elements 24, 224 are forced so hard against the rock wall surface that the wedge cannot move down the shaft any further. This then effectively binds the bolt and inhibits it from rotating any further. This builds up the torque at the drive nut 43, 243 until it reaches a point where it will shear the torque pin 51, 251 thereby letting the drive nut to move relative to the shaft. This relative movement then causes the nut to wind up the shaft.

Once the drive nut is able to move along the bolt shaft, it will then move into engagement with the outer face 102 of the rock strata 500 (either directly or through a bearer plate) which will then enable the bolt to be placed in tension as the effective length of the bolt between the drive nut and the anchoring device is shortened. This places the rock strata in compression. Once the bolt is under sufficient tension, the drilling apparatus can then be removed and the final stage of setting the bolt in place by the introduction of the grout through the inner passage of the bolt can then be performed as required.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

Variations and/or modifications may be made to the parts previously described without departing from the spirit or ambit of the invention.

The invention claimed is:

1. A self drilling rock bolt comprising first and second ends, a shaft extending between the ends, and an anchoring device, the first end having a drill tip to penetrate rock and the second end being adapted to be connected to a drilling apparatus to allow rotation of, and thrust to, the bolt, the anchoring device being operative to retain the bolt when located in a drilled hole and comprising a mandrel having one or more external surfaces that are inclined to the shaft, the mandrel being mounted to, or integrally formed with, the shaft and at least one expansion element overlaying the mandrel, wherein the at least one expansion element is displaced radially outwardly on a predetermined relative movement between the mandrel and the at least one expansion element, and the bolt is rotated about the shaft axis in a first direction in a drilling operation and is rotated in an opposite second direction to cause the predetermined movement between the mandrel and the at least one expansion element so as to enable the anchoring device to become operative to retain the bolt in a drilled hole.

2. A self drilling rock bolt according to claim 1, further comprising a band disposed about the anchoring device, the band including a profiled surface that is arranged to grip the wall surface of a drilled hole on rotation of the band in the second direction so as to induce rotation of the shaft relative to the anchoring device.

3. A self drilling rock bolt according to claim 2, wherein the profiled surface of the band is arranged to pass over the rock surface on rotation of the bolt in the first direction.

4. A self drilling rock bolt according to claim 2, wherein the band incorporates a band body and a plurality of flaps which form the profiled surface of the band and which extend from the band body, wherein on engagement of the surface of the band with the wall surface of a drilled hole, the flaps are biased to fold against the band body when rotated in the first direction and are biased to extend outwardly so as to grip the wall surface of the drilled hole when the bolt is rotated in the second direction.

5. A self drilling rock bolt according to claim 2, wherein the band is formed from a polymeric material.

6. A self drilling bolt according to claim 1, wherein the bolt is arranged to allow fluid to be passed between the ends when located in a drilled hole.

7. A self drilling rock bolt according to claim 6, wherein the shaft incorporates an inner passage through which fluid is arranged to pass between the first and second ends.

8. A self drilling rock bolt according to claim 1, wherein the drill tip extends radially a distance greater than the radius of the shaft to provide a passage to convey fluids between the shaft and the wall of the drilled hole.

9. A self drilling rock bolt according to claim 1, further comprising a drill bit which is connected to an end of the shaft and incorporates the drill tip thereon, the drill bit being connected to the end of the shaft by a coupling that is arranged to impart rotation to the drill bit from the shaft when the shaft is rotated in at least one direction.

10. A self drilling rock bolt according to claim 9, wherein the coupling between the drill bit and the shaft comprises a threaded coupling having an external thread on a shank of the drill bit and a complementary inner thread disposed on an inner surface of the shaft that defines said inner passage.

11. A self drilling rock bolt according to claim 1, wherein the anchoring device further comprises a connector and the at least one expansion element depends from the connector, and wherein the connector is captured to prevent axial movement of the at least one expansion element along the shaft.

12. A self drilling rock bolt according to claim 11, wherein the connector is captured by a retaining collar disposed on the shaft.

13. A self drilling rock bolt according to claim 11, wherein a hinge is formed between the connector and the at least one expansion element and wherein the at least one expansion element is arranged to be displaced radially outwardly by pivoting about the hinge.

14. A self drilling rock bolt according to claim 11, wherein a hinge is formed between the connector and the at least one expansion element and wherein the at least one expansion element is arranged to be displaced radially outwardly by pivoting about the hinge.

15. A self drilling rock bolt according to claim 1, wherein the predetermined relative movement is movement of the mandrel relative to the at least one expansion element in a direction axially along the shaft towards the second end.

16. A self drilling rock bolt according to claim 1, wherein the mandrel is mounted to the shaft and the at least one expansion element and the mandrel are restrained from relative rotation about the shaft axis by engagement of the inclined surface(s) of the mandrel with the inner surface of the at least one expansion element.

17. A self drilling rock bolt according to claim 1, wherein the at least one expansion element is restrained from axial movement along the bolt shaft.

18. A self drilling rock bolt according to claim 1, wherein the mandrel is connected to the shaft via a threaded coupling comprising an external thread on the shaft and a complementary inner thread disposed on an inner surface of the mandrel.

19. A self drilling rock bolt according to claim 1, further comprising a drive coupler disposed adjacent the second end, and connected to the shaft so as to allow rotation and thrust to be imparted to the bolt shaft.

20. A self drilling rock bolt comprising first and second ends, a shaft extending between the ends, and an anchoring device, the first end having a drill tip to penetrate rock, the drill tip extending radially a distance greater than the radius of the shaft to provide a passage to convey fluids between the shaft and the wall of the drilled hole, the second end being adapted to be connected to a drilling apparatus to allow rotation of, and thrust to, the bolt, the anchoring device being operative to retain the bolt when located in a drilled hole and comprising a mandrel having one or more external surfaces that are inclined to the shaft, the mandrel being mounted to, or integrally formed with, the shaft and at least one expansion element overlaying the mandrel, wherein the at least one expansion element is displaced radially outwardly on a predetermined relative movement between the mandrel and the at least one expansion element.

21. A self drilling rock bolt according to claim 20, wherein the shaft incorporates an inner passage through which fluid is arranged to pass between the first and second ends.

22. A self drilling rock bolt according to claim 20, further comprising a drill bit which is connected to an end of the shaft and incorporates the drill tip thereon, the drill bit being connected to the end of the shaft by a coupling that is arranged to impart rotation to the drill bit from the shaft when the shaft is rotated in at least one direction.

23. A self drilling rock bolt according to claim 20, wherein the anchoring device further comprises a connector and the at least one expansion element depends from the connector, and wherein the connector is captured to prevent axial movement of the at least one expansion element along the shaft.

24. A self drilling rock bolt comprising first and second ends, a shaft extending between the ends, and an anchoring device, the first end having a drill tip to penetrate rock and the second end being adapted to be connected to a drilling apparatus to allow rotation of, and thrust to, the bolt, the anchoring device being operative to retain the bolt when located in a drilled hole and comprising a mandrel having one or more external surfaces that are inclined to the shaft, the mandrel being mounted to, or integrally formed with, the shaft and at least one expansion element overlaying the mandrel, wherein the at least one expansion element is displaced radially outwardly on a predetermined relative movement between the mandrel and the at least one expansion element, the bolt being arranged to allow fluid to be passed between the ends when located in a drilled hole and the shaft incorporates an inner passage through which fluid is arranged to pass between the first and second ends.

25. A self drilling rock bolt according to claim 24, further comprising a drill bit which is connected to an end of the shaft and incorporates the drill tip thereon, the drill bit being connected to the end of the shaft by a coupling that is arranged to impart rotation to the drill bit from the shaft when the shaft is rotated in at least one direction.

26. A self drilling rock bolt according to claim 24, wherein the anchoring device further comprises a connector and the at least one expansion element depends from the connector, and wherein the connector is captured to prevent axial movement of the at least one expansion element along the shaft.

27. A self drilling rock bolt comprising first and second ends, a shaft extending between the ends, an anchoring device, and a drill bit connected to an end of the shaft and incorporating a drill tip thereon which forms the first end of the bolt and is arranged to penetrate rock, the second end of the bolt being adapted to be connected to a drilling apparatus to allow rotation of, and thrust to, the bolt, the anchoring device being operative to retain the bolt when located in a drilled hole and comprising a mandrel having one or more external surfaces that are inclined to the shaft, the mandrel being mounted to, or integrally formed with, the shaft and at least one expansion element overlaying the mandrel, wherein the at least one expansion element is displaced radially outwardly on a predetermined relative movement between the mandrel and the at least one expansion element, and the drill bit being connected to the end of the shaft by a coupling that is arranged to impart rotation to the drill bit from the shaft when the shaft is rotated in at least one direction.

28. A self drilling rock bolt according to claim 27, wherein the coupling between the drill bit and the shaft comprises a threaded coupling having an external thread on a shank of the drill bit and a complementary inner thread disposed on an inner surface of the shaft that defines said inner passage.

29. A self drilling rock bolt according to claim 27, wherein the anchoring device further comprises a connector and the at least one expansion element depends from the connector, and wherein the connector is captured to prevent axial movement of the at least one expansion element along the shaft.

30. A self drilling rock bolt according to claim 29, wherein the connector is captured between the drill bit and the shaft end.

31. A self drilling rock bolt comprising first and second ends, a shaft extending between the ends, and an anchoring device, the first end having a drill tip to penetrate rock and the second end being adapted to be connected to a drilling apparatus to allow rotation of, and thrust to, the bolt, the anchoring device being operative to retain the bolt when located in a drilled hole and comprising a mandrel having one or more external surfaces that are inclined to the shaft, the mandrel being mounted to, or integrally formed with, the shaft, at least one expansion element overlaying the mandrel, and a connector, wherein the at least one expansion element depends from the connector and is displaced radially outwardly on a predetermined relative movement between the mandrel and the at least one expansion element, and the connector is captured to prevent axial movement of the at least one expansion element along the shaft.

32. A self drilling rock bolt according to claim 31, wherein the connector is captured by a retaining collar disposed on the shaft.

33. A self drilling rock bolt comprising first and second ends, a shaft extending between the ends, a drive coupler connected to the shaft, and an anchoring device, the first end having a drill tip to penetrate rock and the drive coupler being disposed adjacent the second end and being adapted to be connected to a drilling apparatus to allow rotation of, and thrust to, the bolt, the anchoring device being operative to retain the bolt when located in a drilled hole and comprising a mandrel having one or more external surfaces that are inclined to the shaft, the mandrel being mounted to, or integrally formed with, the shaft and at least one expansion element overlaying the mandrel, wherein the at least one expansion element is displaced radially outwardly on a predetermined relative movement between the mandrel and the at least one expansion element.

34. A self drilling rock bolt according to claim 33, wherein the drive coupler is in the form of a drive nut which is connected to the bolt shaft through a threaded coupling comprising an external thread disposed on the shaft and a complementary inner thread disposed on an inner surface of the drive nut.

35. A self drilling rock bolt according to claim 34, wherein the threaded couplings of the mandrel and the drive nut to the shaft have the same thread direction.

36. A self drilling rock bolt according claim 34, further comprising a stop assembly secured to the shaft and operative to inhibit axial movement of the drive nut beyond a predetermined location on the shaft.

37. A self drilling rock bolt according to claim 36, wherein the stop assembly is in the form of a lock nut secured to a terminal end of the shaft.

38. A self drilling rock bolt according to claim 34, further comprising a torque device operative to restrict axial movement of the drive nut along the shaft until a predetermined torque is applied to the nut.

39. A self drilling rock bolt according to claim 38, wherein the torque device is in the form of a torque pin which extends radially through the nut and into the shaft, the torque pin being operative to shear on the application of a predetermined torque to the nut.

* * * * *